United States Patent [19]
Kohno

[11] Patent Number: 5,136,340
[45] Date of Patent: Aug. 4, 1992

[54] RECORDING APPARATUS

[75] Inventor: Takeshi Kohno, Yokohama, Japan

[73] Assignee: Canon Kabushiki Kaisha, Tokyo, Japan

[21] Appl. No.: 752,901

[22] Filed: Aug. 26, 1991

Related U.S. Application Data

[63] Continuation of Ser. No. 404,129, Sep. 7, 1989, abandoned.

[30] Foreign Application Priority Data

Sep. 8, 1988 [JP] Japan .................. 63-223555

[51] Int. Cl.$^5$ ............... G03G 21/00; B65H 23/32; B65H 29/54
[52] U.S. Cl. .................. 355/309; 226/198; 271/313; 346/76 PH
[58] Field of Search .............. 355/308, 309, 310; 346/24, 25, 134, 136, 76 PH; 358/304, 296; 226/198, 196, 199; 271/312, 313; 400/642, 120

[56] References Cited

U.S. PATENT DOCUMENTS

| | | | |
|---|---|---|---|
| 3,743,154 | 7/1973 | Brewitz | 226/196 X |
| 4,623,139 | 11/1986 | Ebata | 271/272 |
| 4,926,358 | 5/1990 | Tani et al. | 355/311 X |
| 5,014,135 | 5/1991 | Ijuin et al. | 358/296 |

FOREIGN PATENT DOCUMENTS 0114064  6/1985  Japan .................. 358/304

*Primary Examiner*—A. T. Grimley
*Assistant Examiner*—Nestor R. Ramirez
*Attorney, Agent, or Firm*—Fitzpatrick, Cella, Harper & Scinto

[57] ABSTRACT

A recording apparatus comprising a platen roller for feeding recording sheets, a recording head for recording image on the recording sheets fed by the platen roller and arranged in confronting relation to the platen roller and a guide member for guiding the recording sheet fed by the platen roller. The guide member is arranged at downstream side of a sheet feeding direction with respect to the platen roller and is positioned by abutting it against a portion of the platen roller. With this arrangement, the guide member can easily and precisely positioned with respect to the platen roller without any specific adjustment during assembling the recording apparatus.

35 Claims, 6 Drawing Sheets

RECORDING APPARATUS

This application is a continuation of application Ser. No. 404,129 filed Sept. 7, 1989, now abandoned.

BACKGROUND OF THE INVENTION

1. Field of the Invention

The present invention relates to a recording apparatus such as a facsimile, printer, copying machine and the like, and more particularly, it relates to a recording apparatus which can positively direct a sheet on which an image is recorded towards a cutter.

2. Related Background Art

Nowadays, recording apparatuses such as facsimiles, printers and the like have widely been used. In general, a recording system used with such recording apparatus is constituted as shown in FIG. 7. More particularly, a heat sensitive recording sheet 51 is fed out from a sheet roll by means of a platen roller 50, the recording sheet 51 is selectively heated by a recording head 52 to form an image thereon, and the sheet 51 is cut rearwardly of the image by means of a cutter 53, and then the cut sheet is ejected.

With such arrangement, in order to positively feed the recorded sheet between a movable blade 53a and a fixed blade 53b of the cutter 53, guides 54 and 55 are arranged between the platen roller 50 and the cutter 53. A distance or gap 56 between the platen roller 50 and the guide 54 must be controlled so that the recording sheet 51 does not escape from the gap 56. Further, the guide 54 must be controlled so that the end of the guide 54 adjacent the cutter is positioned higher than the movable blade 53a and a distance or gap between the end of the guide and the movable blade 53a is not so large as to prevent a leading edge of the recording sheet 51 from escaping below the movable blade. To this end, conventionally, the gap 56 was controlled and adjusted when the guide 54 or cutter 53 is installed.

Incidentally, in a conventional technique when a frame of the facsimile and the like was constituted by a sheet metal chassis, it was practical that the platen roller 50 was rotatably fitted into holes formed on both side walls of the chassis, and the guides 54, 55 and the cutter 53 were fixedly mounted on a stay of the chassis. In this case, the adjustments of the gaps between the guide 54 and the platen roller 50 and/or the cutter 53 relied upon the dimensional accuracy of various parts. The reason is that the cutter 53 must be positioned with respect to the chassis in order to ensure the proper cutter stroke, since a driving link for the cutter 53 is positioned by the chassis.

Further, in some cases, the frame is constituted by a chassis having a base made of molded resin. In this case, the orientation of threaded holes is restricted by the cost-down of the mold. In such circumstances, the gap between the platen roller 50 and the guide 54 is adjusted when the guide 54 is attached onto the chassis base from top by means of screws. Further, the cutter 53 is fixed to the chassis base while positioning the former by fitting the holes of the cutter onto pins formed on the chassis base. In this case, the guide 54 is fastened together with the cutter between the chassis base and the cutter 53.

It is desired to make the facsimile and the like compact. In this case, if a diameter of a core 51a of the sheet roll is decreased, when the amount of the recording sheet 51 in the sheet roll is reduced, the recording sheet will be a curled condition. For example, when the diameter of the core 51a of the sheet roll is about 16 mm and the outer diameter of to the platen roller 50 is about 16 mm, such curl will be of the order of 18–20 mm.

Therefore, the curled recording sheet 51 tends to enter into the gap 56 between the platen roller 50 and the guide 54; in such a case, in order to prevent the recording sheet from entering into the gap 56, the dimension of the gap must be limited to 0.3–0.8 mm or less.

However, as in the conventional case, when the adjustment of the gap relies upon the dimensional accuracy of various parts or when the gap is not adjusted, the dimension of the gap will be 1 mm or more at the least. Therefore, in order to control the gap between the guide and the platen roller and/or the cutter, the adjustment of the gap must be performed for each recording apparatus, which prevents the costdown of the apparatus and/or causes inferiority of the apparatus due to the error of the gap adjustment.

In addition, when the chassis is constituted by the molded resin, since the number of bends in the guides is increased and the guides are fastened together with the cutter, the adjustment of the gaps must be performed more precisely.

SUMMARY OF THE INVENTION

An object of the present invention is to provide a recording apparatus which can solve the above-mentioned conventional problems and can easily control the positioning of a guide member for guiding a recording sheet toward a cutter.

The above object is achieved by providing a recording apparatus according to the present invention, which comprises feeding means for feeding a recording sheet, a recording head for recording an image on the recording sheet fed by feeding means, a cutter for cutting off the recording sheet, and a guide member for guiding the recording sheet from feeding means to the cutter, the guide member being positioned by abutting it against a portion of feeding means. Further, the guide member is abutted against feeding means by means of bias means or by constituting the guide member itself as an elastic element.

With this arrangement, the guide member can be positioned only by abutting it against the portion of feeding means, and the gap between feeding means and the guide member can be controlled with high accuracy only by ensuring the accuracy of manufacture of feeding means and the guide member. Accordingly, there is no need to control the gap between the feeding means and the guide member during assembling the apparatus.

DETAILED DESCRIPTION OF THE PREFERRED EMBODIMENTS

The present invention will now be explained in connection with embodiments thereof wherein the present invention is applied to a facsimile apparatus, with reference to the accompanying drawings.

Figure 1:
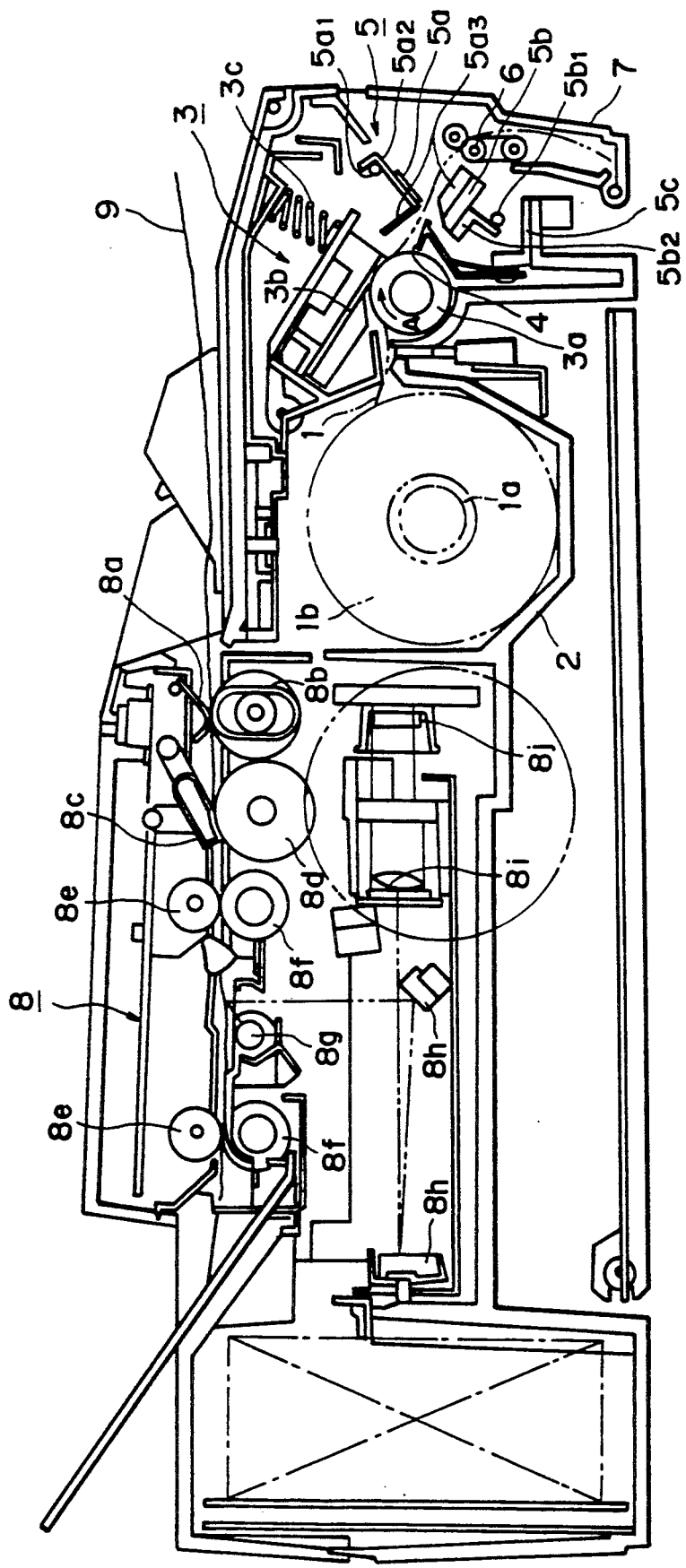
FIG. 1 is a longitudinal sectional view of a facsimile apparatus according to a preferred embodiment of the present invention.
Figure 2A:
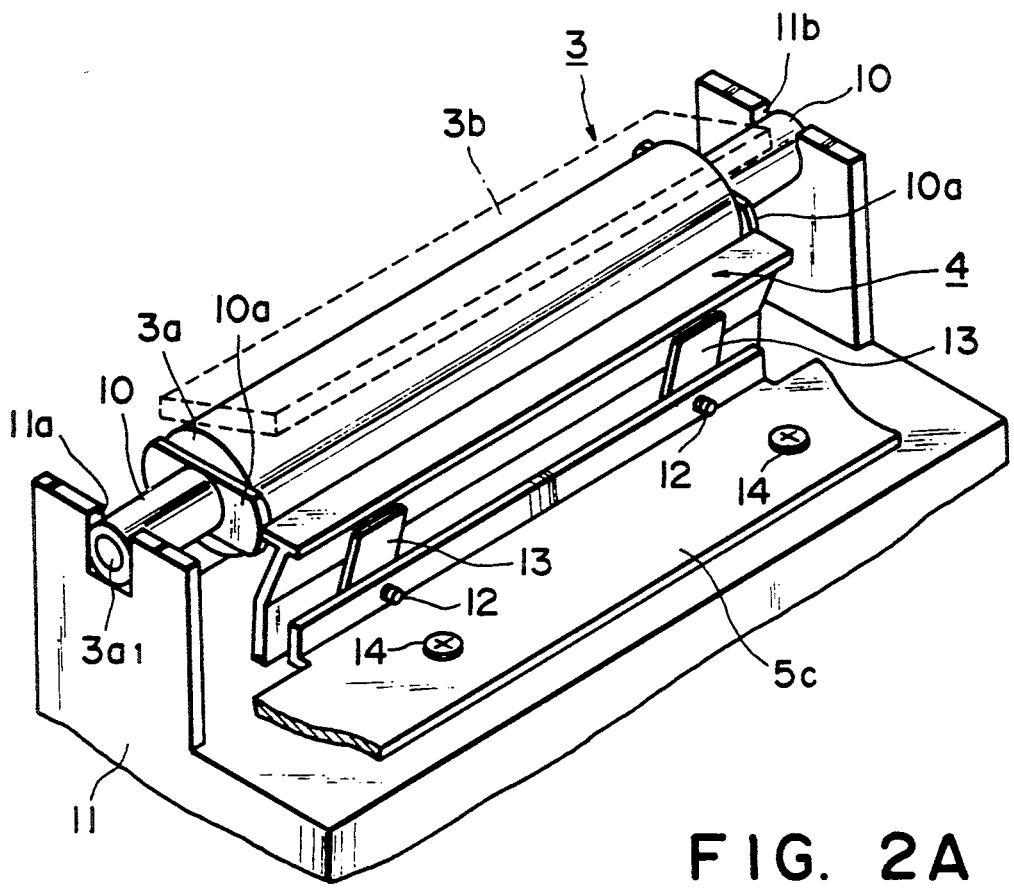
FIG. 2A is a perspective view showing an attaching arrangement for a guide member according to a first embodiment.
Figure 2B:
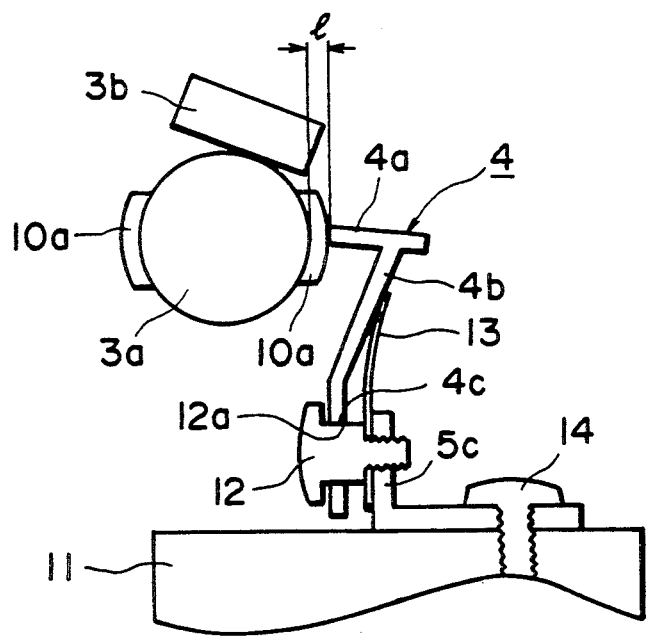
FIG. 2B is a sectional view of the arrangement of FIG. 2A.

First of all, the whole construction of the facsimile apparatus will be explained with reference to FIG. 1 showing a longitudinal sectional view of the facsimile apparatus and to FIGS. 2A and 2B showing a perspective view and a sectional view of an attaching arrangement for a guide member, respectively. The reference numeral 1 designates a heat sensitive recording sheet on which an image can be recorded by applying heat thereto. The recording sheet 1 is fed from a sheet roll 1b obtained by winding the long recording sheet around a central core 1a having a diameter of 16 mm and retained in a holder 2 in a drop-in fashion.

The image is formed or recorded on the recording sheet 1 at a recording portion 3 which will be described later, and the recorded sheet is fed through a guide member 4 to a cutter 5, where the recorded sheet is cut rearwardly of the image, and the cut sheet is ejected by ejector rollers 6 to be stacked into a reverse tray 7.

The reference numeral 8 designates an original reading portion, where originals 9 stacked on an original support are separated one by one by means of a preliminary feed roller 8b pressed against a separating pressor lug 8a and a separating roller 8d pressed against a separating pressor lug 8c, and the separated original 9 is fed by means of a feed roller 8f pressed against an urging roller 8e. The light from a light source 8g is illuminated onto the original 9 being fed, and the reflected light reflected from the original is directed, through a reflection mirrors 8h and a lens 8i, to a photoelectric converter element 8j such as CCD and the like. When the apparatus is set to a copy mode, an image signal from the photoelectric converter element is sent to the recording portion 3 of the apparatus itself; whereas, when the apparatus is set to a facsimile mode, the image signal from the photoelectric converter element is transmitted to a recording portion of the facsimile apparatus.

The recording portion 3 comprises a platen roller 3a acting also as feeding means and driven by a motor (not shown), a recording head 3b having an array of heating elements selectively heated in response to the image signal, and a bias spring 3c for urging the recording head to a surface of the platen roller. With this arrangement, the image is recorded on the recording sheet 1 by rotating the platen roller 3a in a direction shown by the arrow A to feed the recording sheet 1 and at the same time by selectively heating the heating elements on the recording head in response to the image signal.

Next, the cutter 5 will be explained. The cutter is a swinging cutter comprising a fixed cutter blade 5a and a movable cutter blade 5b. The fixed cutter blade 5a is attached to a fixed blade stay 5a, rotatable around a shaft $5a_1$, and an upper guide portion $5a_3$ for the fixed cutter blade 5a is formed on the stay $5a_2$. Similarly, the movable blade 5b is attached to a movable stay $5b_2$ rotatable around a shaft $5b_1$, and a guide portion $5b_3$ for directing the cut recording sheet 1 toward the ejector rollers 6 is formed on an upper surface of the movable cutter blade 5b.

Incidentally, in FIG. 1, the reference numeral 5c designates a cutter chassis constituting a whole frame for the cutter and having both side walls (not shown) including positioning holes therein, into which the shaft $5a_1$ of the fixed cutter blade 5a is rotatably fitted to bias the fixed cutter blade toward the movable cutter blade 5b. Further, the shaft $5b_1$ of the movable cutter blade 5b is also rotatably fitted into the positioning holes of the side walls of the cutter chassis, and is connected to a motor (not shown) to receive a rotational force from the latter. When the movable cutter blade 5b is rotated, the movable cutter blade is engaged by the fixed cutter blade 5a, thus cutting the recording sheet 1 inserted between these cutter blades 5a, 5b.

Next, an attaching arrangement for the guide member 4 for guiding the recording sheet 1 from the recording portion 3 to the cutter 5 will be explained.

As shown in FIGS. 2A and 2B, the guide member 4 is arranged to abut against bearings 10 of the platen roller 3a. More particularly, a shaft $3a_1$ of the platen roller 3a is rotatably supported at both ends, by corresponding bearings 10 which are received in U-shaped recesses 11a, 11b formed in a base 11.

Each bearing 10 has a flange 10a having radius larger than that of the platen roller (having a diameter of 16 mm) by a value l (this value is selected to 0.5 mm in the illustrated embodiment). Further, in order to prevent the rotation of each bearing 10 in the corresponding U-shaped recess 11a, 11b, each bearing 10 has diametrical chamfered portions engaged by the side walls of the U-shaped recess, and each of the flanges 10a is arranged not to interfere with the recording head 3b urged against the platen roller 3a.

The guide member 4 is made of rigid sheet metal, and has a guide portion 4a and a bent leg 4b to form a substantially T-shape. Two pin holes 4c are formed in the leg 4b at predetermined positions thereof. The guide member 4 is fixed to the cutter chassis 5c by stepped screws 12 inserted into the corresponding pin holes 4c with the interposition of corresponding leaf springs 13. The guide member 4 fixed to the chassis 5c by means of the stepped screws 12 cannot be moved in both an up-and-down direction and left-and-right direction, but can be slightly moved in front and in the rear (toward and away from the platen roller 3a). That is to say, the guide member 4 can be slid along a cylindrical portion 12a of each stepped screw 12.

When the stepped screws 12 are tightened, the guide member 4 is biased by the leaf springs 13, thus abutting both side edges of the guide portion 4a against the flanges 10a. Of course, the edge of the guide portion 4a opposed to the platen roller 3a has substantially complete straight and flat surface. Thus, the platen roller 3a and the guide portion 4a are arranged in parallel with each other with a gap having correct value l therebetween.

Incidentally, the value l is selected so that the leading edge of the recorded sheet 1 is not inserted into the gap between the platen roller and the guide portion, and the gap value l can easily be set by selecting the radius of each flange 10a of each bearing 10.

Further, the cutter chassis 5c is fixed to the base 11 by means of set screws 14. In this case, the length of the leg 4b of the guide member 4 is selected so that the end (near the cutter) of the guide portion 4a of the guide member 4 attached to the cutter chassis 5c is situated above the movable blade 5b of the cutter attached to the cutter chassis 5c.

By arranging the guide member 4 as mentioned above, the gap between the platen roller 3a and the guide member 4 can be correctly set without any specific adjustment thereof, whereby the recorded recording sheet 1 can positively be fed from the recording portion 3 toward the fixed cutter blade 5a and the movable cutter blade 5b through the guide member 4.

Figure 3:
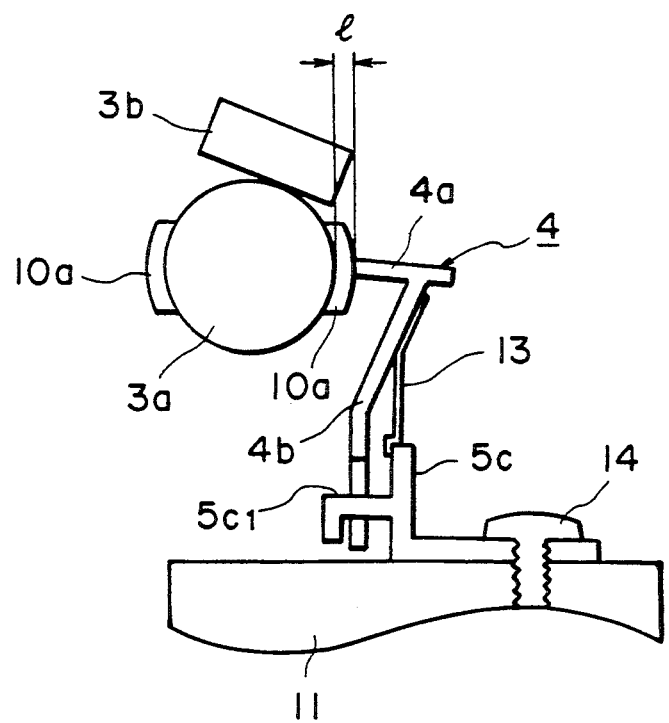
FIG. 3 is a sectional view showing an alteration of the attachment arrangement for the guide member according to the first embodiment.

In the illustrated embodiment, while the guide member 4 was fixed to the cutter chassis 5c by means of the stepped screws 12, as shown in FIG. 3, the leg 4b of the guide member 4 may be slidably attached to locking portions 5c₁ formed on the cutter chassis 5c to prevent the movement of the guide member in the up-and-down and left-and-right directions.

Further, the bias means for urging the guide member 4 is not limited to the leaf springs 13, but may comprise coil springs, torsion coil springs, wave washers, rubber members or the like.

Next, a second embodiment wherein the guide member itself has elasticity will be explained. Incidentally, the same parts or elements as those in the previous first embodiment are designated by the same reference numerals and the detailed explanation thereof will be omitted.

Figure 4A:
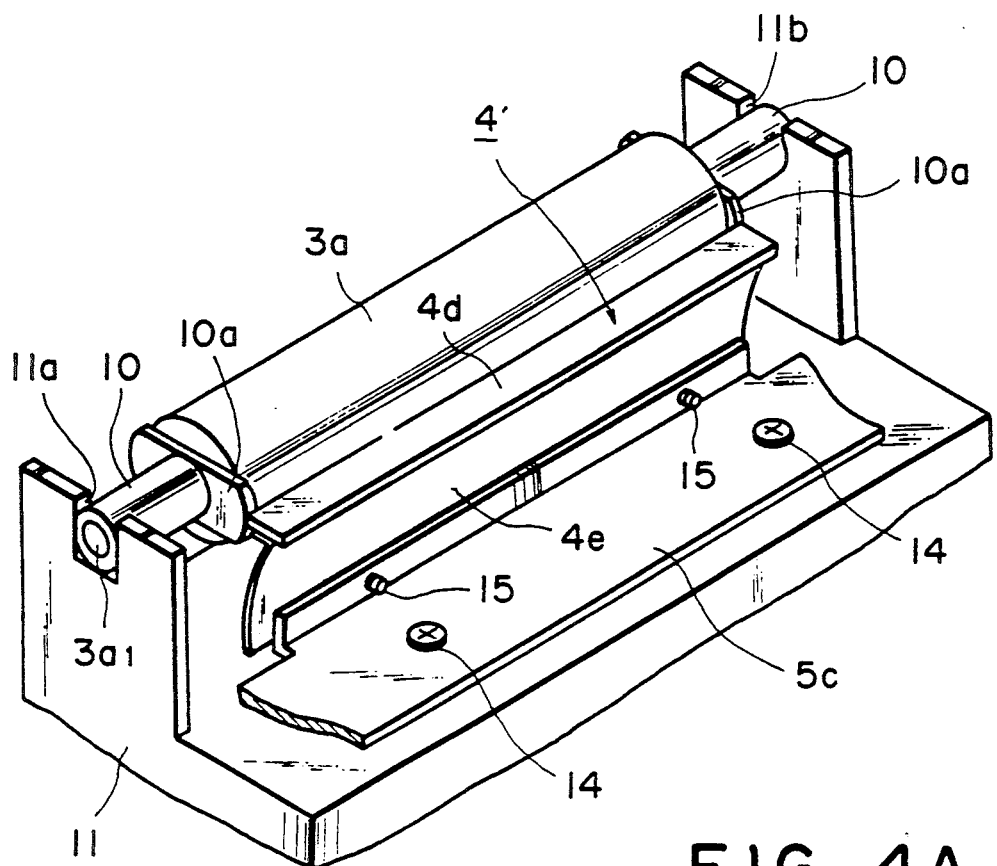
FIG. 4A is a perspective view showing an attaching arrangement for a guide member according to a second embodiment.
Figure 4B:
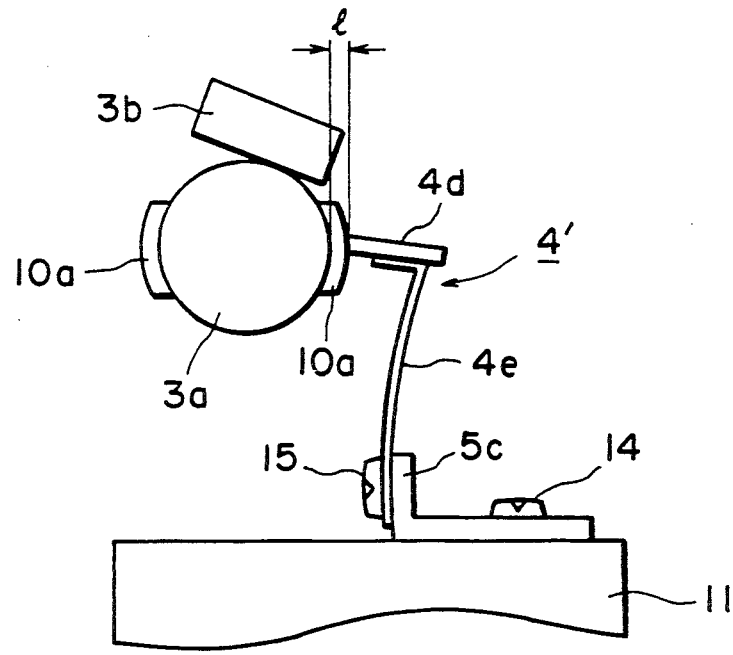
FIG. 4B is a sectional view of the arrangement of FIG. 4A.

A guide member 4' shown in FIGS. 4A and 4B, showing a perspective view and a sectional view of an attaching arrangement for the guide member according to the second embodiment, respectively, comprises a rigid guide portion 4d made of sheet metal and having a straight edge, and a leg 4e made of elastic spring material (such as stainless steel spring plate) and firmly connected to the guide portion 4d by spot welding or screws. The leg 4e of the guide member 4' is attached to the cutter chassis 5c by means of screws 15 in such a manner that the guide portion 4d is abutted against the flanges 10a of the bearings 10 through the elasticity of the leg 4e.

With this arrangement, as in the first embodiment, the gap between the platen roller 3a and the guide portion 4d can easily be set by selecting the radius of each flange 10a larger than that of the platen roller 3a by the value l.

Incidentally, the guide portion 4d and the leg 4e may be integrally formed.

Next, a third embodiment wherein the guide member is abutted against the bearings 10 without biasing the guide member will be explained.

Figure 5A:
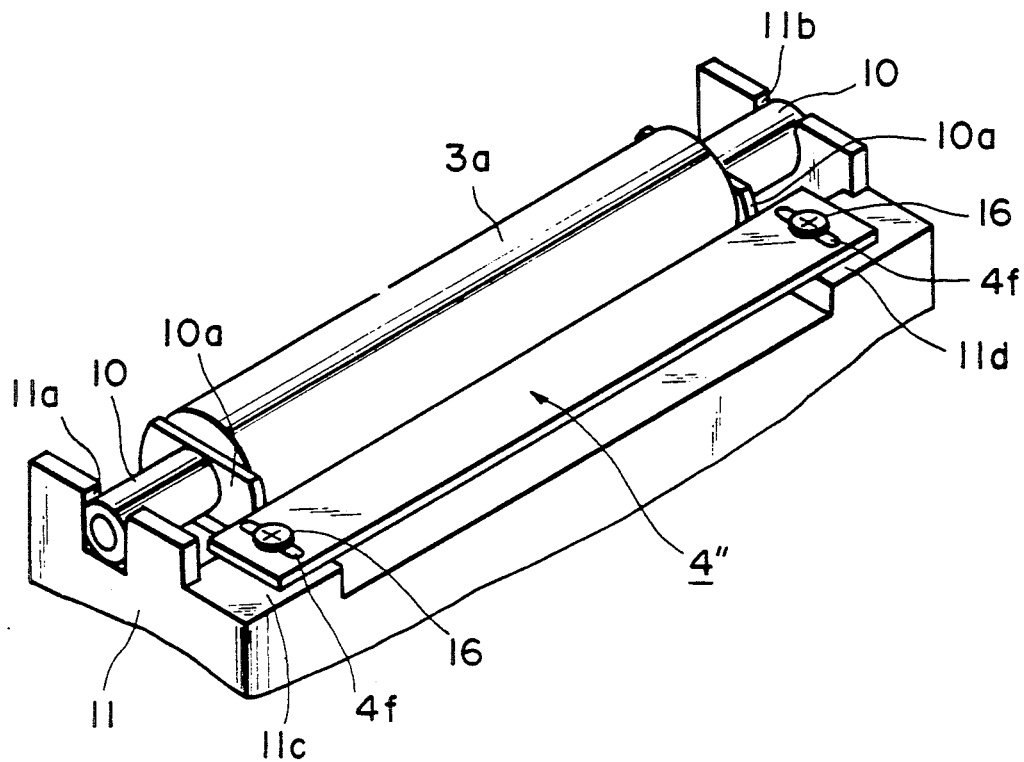
FIG. 5A is a perspective view showing an attaching arrangement for a guide member according to a third embodiment.
Figure 5B:
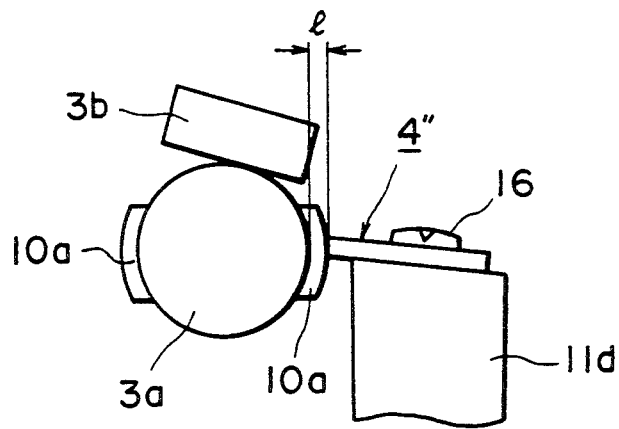
FIG. 5B is a sectional view of the arrangement of FIG. 5A.

A guide member 4" shown in FIGS. 5A and 5B showing a perspective view and a sectional view of an attaching arrangement for the guide member according to the third embodiment, respectively, is made of a rigid sheet metal and has a straight edge, and elongated slots 4f are formed in the guide member 4" at both end portions. On the other hand, base 11 having the U-shaped recesses 11a, 11b for receiving the bearings 10 of the platen roller 3a has attachment portions 11c, 11d to which the guide member 4" is attached by means of screws 16.

In this case, guide member 4" is fixed to the base 11 in a condition that the edge of the guide member 4" is abutted against the flanges 10a of the bearings 10 by shifting the guide member 4" toward the platen roller 3a in the range of the lengths of the elongated slots 4f.

With this arrangement, the gap l between the platen roller 3a and the guide member 4" can easily and correctly be set by selecting the radius of each flange 10a larger than that of the platen roller 3a by the value l.

Finally, other embodiments will be explained.

In the above mentioned first to third embodiments, while each flange was formed as having an elongated shape extending in two directions not to interfere with the recording head 3b as shown; however, if the recording head 3b is shorter than the platen roller 3a, each of the flanges 10a may be formed as a circular shape. In this case, each bearing 10 may not have the diametrical chamfers for preventing the rotation of the bearing.

Figure 6:
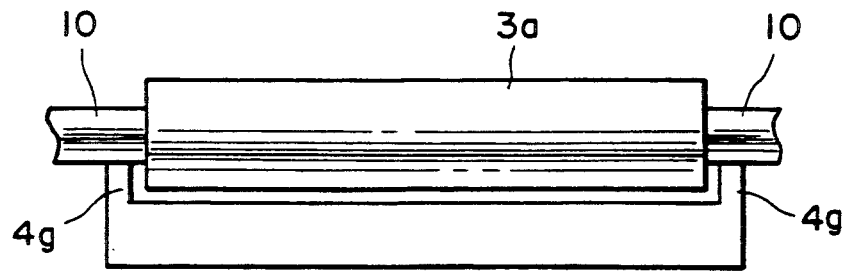
FIG. 6 is an elevational view showing another construction of a guide member.
Figure 7:
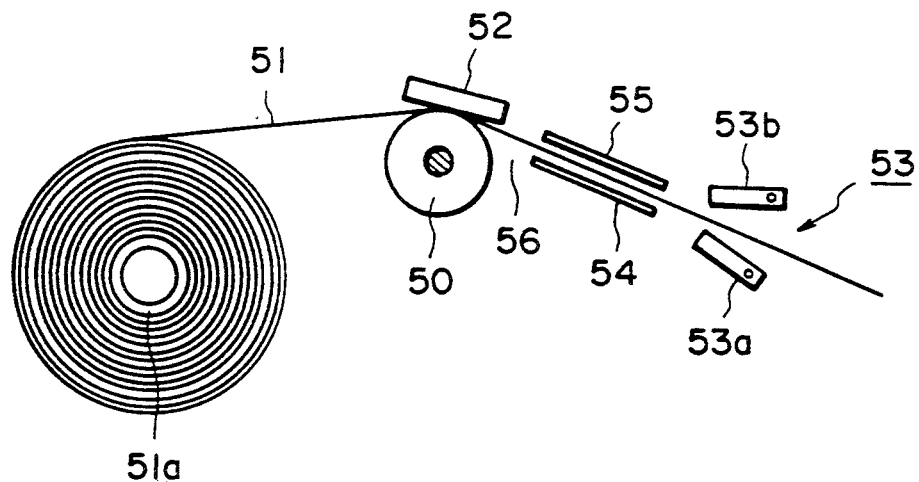
FIG. 7 is a schematic sectional view showing a conventional technique.

Further, in the above mentioned first to third embodiments, while the guide member had the straight edge for abutting against the flanges 10a, the guide member may be constructed as shown in FIG. 6. That is to say, as shown in FIG. 6, the guide member may be provided at both ends with positioning pawls 4g through which the guide member is abutted against the bearings 10 of the platen roller 3a.

With this arrangement, the flanges 10a may not be formed on the bearings 10 and the chamfers for preventing the rotation of the bearing may not be provided on the respective bearing 10.

Alternatively, the pawls 4g of the guide member may be abutted against the shaft 3a₁ of the platen roller 3a.

Further, in the above mentioned first to third embodiments, while the bearings 10 were received into the U-shaped recesses 11a, 11b of the base 11, the bearings 10 may be directly fixed to the base 11 by means of set screws or the like. In addition, the method for attaching the guide member 4' or 4" to the cutter chassis 5c or the base 11 is not limited to the illustrated example, but the guide member may be fixed to the cutter chassis or the base by means of a welding technique and the like.

Further, in the first and second embodiments while the guide member 4 or 4' was attached to the cutter chassis 5c, and in the third embodiment while the guide member 4" was attached to the base 11, any member or element to which the guide member is attached may be used so long as the guide member can be positioned correctly between the platen roller 3a and the cutter 5.

As mentioned, according to the present invention, since the guide member for guiding the recording sheet from the recording portion to the cutter is positioned by abutting it against the portion of the feeding means, the positioning between feeding means and the guide member can easily be controlled with high accuracy. Further, since there is no need to adjust the gap between feeding means and the guide member during assembling the apparatus, the assembling operation can be simplified, thus permitting the cost-down of the apparatus and ensuring the positioning accuracy.

Further, when the guide member is biased against feeding means by the elastic force, the guide member and the cutter can previously be assembled as a unit, thus decreasing the number of assembling processes for assembling the recording apparatus in the production line.

I claim:

1. A recording apparatus, comprising:

feed means for feeding sheets said feed means having a rotary member for transmitting feed force to the sheets;

record means for recording images on the sheets fed by said feed means, said record means being arranged in confronting relation to said feed means;

guide means for guiding the sheets fed by said feed means, said guide means being arranged at a downstream side of a sheet feeding direction with respect to said feed means;

support means for movably supporting said guide means;

spacer means abutting against said rotary member and said guide means; and bias means for biasing said guide means against between said guide means and said rotary member.

2. A recording apparatus according to claim 1, wherein said feed means includes a roller, and said record means includes a recording head, said sheet being pinched between said roller and said recording head.

3. A recording apparatus according to claim 1, wherein said guide means is abutted against said flanges.

4. A recording apparatus according to claim 3, wherein said guide means is movably mounted in a direction toward said flanges.

5. A recording apparatus according to claim 1, wherein said spacer means includes a bearing rotatably supporting said rotary member.

6. A recording apparatus, comprising:
feed means for feeding sheets, said feed means having a rotary member for transmitting feed force to the sheets;

record means for recording images on the sheets and for pinching the sheet by cooperating with said feed means;

a cutter arranged at a downstream side of said feed means with respect to a sheet feeding direction for cutting the sheets;

a guide member for guiding the sheets from said feed means to said cutter;

support means for supporting said guide member relative to said feed means;

spacer means abutting against said rotary member and said guide member; and bias means for biasing said guide member to abut against said spacer means to thereby form a gap between said guide member and said rotary member.

7. A recording apparatus according to claim 6, wherein said feed means includes a platen roller.

8. A recording apparatus according to claim 8, wherein said record means includes a recording head.

9. A recording apparatus according to claim 8, further including elastic members for urging said recording head against said platen roller.

10. A recording apparatus according to claim 6, wherein said support means includes elastic portions for biasing said guide member toward said spacer means.

11. A recording apparatus according to claim 8, wherein said spacer means includes a bearing rotatably supporting said rotary member.

12. A sheet feeding apparatus, comprising:
feed means disposed at a position along a sheet feed path for feeding the sheets, said feed means having a rotary member for transmitting feed force to the sheets;

a guide member disposed at a position adjacent to said feed means along the sheet feed path for feeding the sheets;

support means for movably supporting said guide member;

spacer means abutting against said rotary member and said guide member; and bias means for biasing said guide member to abut against said spacer means to thereby from a gap between said guide member and said rotary member.

13. A sheet feeding apparatus according to claim 13, wherein an abut portion is formed on a flange formed on a bearing rotatively supporting said rotary member.

14. A sheet feeding apparatus according to claim 12, wherein said guide member has a plate-like guide member.

15. A sheet feeding apparatus according to claim 12, further comprising support means for supporting a rolled sheet, said feed means feeding the sheet supported by said support means.

16. A sheet feeding apparatus according to claim 15, wherein said guide member is disposed at a downstream side of said feed means.

17. A sheet feeding apparatus according to claim 16, said guide member guiding a surface of the rolled sheet facing toward a center of the roll.

18. A sheet feeding apparatus according to claim 16, further comprising cut means for cutting the sheets at said downstream side of said guide member.

19. A sheet feeding apparatus according to claim 18, wherein said guide member attached on the main body via said cut means.

20. A sheet feeding apparatus according to claim 12, further comprising image forming means for forming images on the sheets fed by said feed means.

21. A sheet feeding apparatus according to claim 20, wherein said image forming means forms the images corresponding to image signals transmitted.

22. A sheet feeding apparatus according to claim 12, wherein said feed means and guide member are disposed at the same side with respect to the sheet feed path.

23. A recording apparatus according to claim 12, wherein said spacer means includes a bearing rotatably supporting said rotary member.

24. A sheet feeding apparatus, comprising:
feed means for feeding the sheets, said feed means having a rotary member for transmitting feed force to the sheets;

guide means disposed serial to said feed means and mounted movably independent from said feed means for guiding the sheets fed by said feed means; and a spacer abutting against said rotary member and said guide means; and a resilient member for biasing said guide means to abut against said spacer to thereby form a gap between said guide means and said rotary member.

25. A sheet feeding apparatus according to claim 15, wherein an abut portion is formed on a flange formed on a bearing rotatively supporting said rotary member.

26. A sheet feeding apparatus according to claim 24, wherein said guide means has a plate-like guide member.

27. A sheet feeding apparatus, comprising:
a feed rotary member for feeding sheets;

guide means mounted for guiding the sheets fed by said feed rotary member;

a support member for supporting said guide means movable relative to said rotary feed means; and a spacer abutting against said feed rotary member and said guide means to form a predetermined gap between said feed rotary member and said guide means.

28. A sheet feeding apparatus according to claim 27, wherein said guide means has a plate-like guide member.

29. A sheet feeding apparatus according to claim 27, wherein said guide means is movably mounted on the main body 30. A sheet feeding apparatus according to claim 29, further comprising support member for supporting said guide means resiliently.

31. A sheet feeding apparatus according to claim 29, further comprising bias means for biasing said guide means against said feeding means.

32. A sheet feeding apparatus according to claim 27, further comprising roller sheet support means for supporting a rolled sheet, said feed means feeding the sheet supported by said roller means support means.

33. A sheet feeding apparatus according to claim 32, wherein said guide means is disposed at a downstream side of said feed means.

34. A sheet feeding apparatus according to claim 33, wherein said guide means guiding a surface of the rolled sheet facing toward a center of the roll.

35. An image forming apparatus, comprising:

feed means mounted at a position along a sheet feed path for feeding sheets, said feed means having a rotary member for transmitting feed force to the sheet;

guide means mounted at a location adjacent to said feed means along the sheet feed path independent from said feed means for guiding the sheets;

support means for supporting said guide means movable relative to said feed means;

record means for recording images corresponding to image signals transmitted onto the sheets to be fed to said feed means; and a spacer abutting against said feed rotary member and said guide means forming a predetermined gap between said feed rotary member and said guide means.

* * * * *

UNITED STATES PATENT AND TRADEMARK OFFICE
CERTIFICATE OF CORRECTION

PATENT NO. : 5,136,340

DATED : August 4, 1992

INVENTOR(S) : Takeshi KOHNO

It is certified that error appears in the above-identified patent and that said Letters Patent is hereby corrected as shown below:

On the title page:

[57] ABSTRACT

Line 11, "can" should read -- can be--.

COLUMN 1

Line 15, "facsimiles" should read --facsimiles,--.

COLUMN 2

Line 2, "to" should be deleted.
Line 52, "during" should read --when--.

COLUMN 7

Line 15, "against be-" should read --against said spacer means to form a predetermined gap be- --.

Line 22, "wherein said" should read --wherein said feed means includes bearings with flanges formed thereon and said--.

UNITED STATES PATENT AND TRADEMARK OFFICE
CERTIFICATE OF CORRECTION

PATENT NO. : 5,136,340

DATED : August 4, 1992

INVENTOR(S) : Takeshi KOHNO

It is certified that error appears in the above-identified patent and that said Letters Patent is hereby corrected as shown below:

COLUMN 8

Line 9, "from" should read --form--.
Line 12, "claim 13," should read --claim 12,--.
Line 19, "comprising" should read --comprising rolled sheet--.
Line 21, "said" should read --said rolled sheet--.
Line 61, "claim 15," should read --claim 24,--.

COLUMN 9

Line 14, "body" should read --body.--.
Line 22, "roller sheet" should read --rolled sheet--.
Line 24, "roller means" should read --rolled sheet--.

Signed and Sealed this

Twelfth Day of October, 1993

Attest:

BRUCE LEHMAN

Attesting Officer

Commissioner of Patents and Trademarks